(12) United States Patent
Brockie

(10) Patent No.: US 10,360,928 B1
(45) Date of Patent: Jul. 23, 2019

(54) DATA STORAGE DEVICE EMPLOYING INTERLACED RECORDING FOR EFFICIENT COLD DATA STORAGE

(71) Applicant: Western Digital Technologies, Inc., San Jose, CA (US)

(72) Inventor: Richard M. Brockie, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/178,271

(22) Filed: Nov. 1, 2018

(51) Int. Cl.
- *G11B 20/12* (2006.01)
- *G11B 5/012* (2006.01)
- *G06F 12/02* (2006.01)

(52) U.S. Cl.
CPC .......... *G11B 5/012* (2013.01); *G06F 12/0253* (2013.01); *G06F 2212/702* (2013.01)

(58) Field of Classification Search
CPC ......... G11B 20/12; G11B 27/36; G11B 20/18; G11B 5/00; G06F 3/0611; G06F 3/0646; G06F 3/0653; G06F 3/0676; G06F 12/0866; G06F 2212/1024; G06F 2212/21; G06F 3/06; G06F 12/0246; G06F 3/0638; G06F 3/0688; G06F 12/10

USPC .......................................................... 360/48
See application file for complete search history.

(56) References Cited

U.S. PATENT DOCUMENTS

| | | | |
|---|---|---|---|
| 8,976,479 B2* | 3/2015 | Cideciyan | G11B 5/00813 360/55 |
| 9,099,103 B1 | 8/2015 | Krichevsky | |
| 9,508,362 B2 | 11/2016 | Gao et al. | |
| 9,524,743 B2 | 12/2016 | Zhu et al. | |
| 9,741,364 B2 | 8/2017 | Rausch et al. | |
| 9,747,942 B2 | 8/2017 | Gao et al. | |
| 9,830,940 B1 | 11/2017 | Granz | |
| 10,163,462 B1 | 12/2018 | Rice et al. | |
| 10,216,624 B1 | 2/2019 | Tiotantra et al. | |

* cited by examiner

*Primary Examiner* — Nabil Z Hindi

(57) ABSTRACT

A data storage device is disclosed comprising a head actuated over a disk comprising a plurality of tracks. A plurality of interlaced recording (IR) zones are defined on the disk, wherein each IR zone comprises a plurality of top tracks partially overlapping a plurality of bottom tracks. First data is written to the bottom tracks of a first IR zone, and the first IR zone is identified as a cold IR zone that is storing cold data. In response to identifying the first IR zone as a cold IR zone, second data is written to the top tracks of the first IR zone.

20 Claims, 7 Drawing Sheets

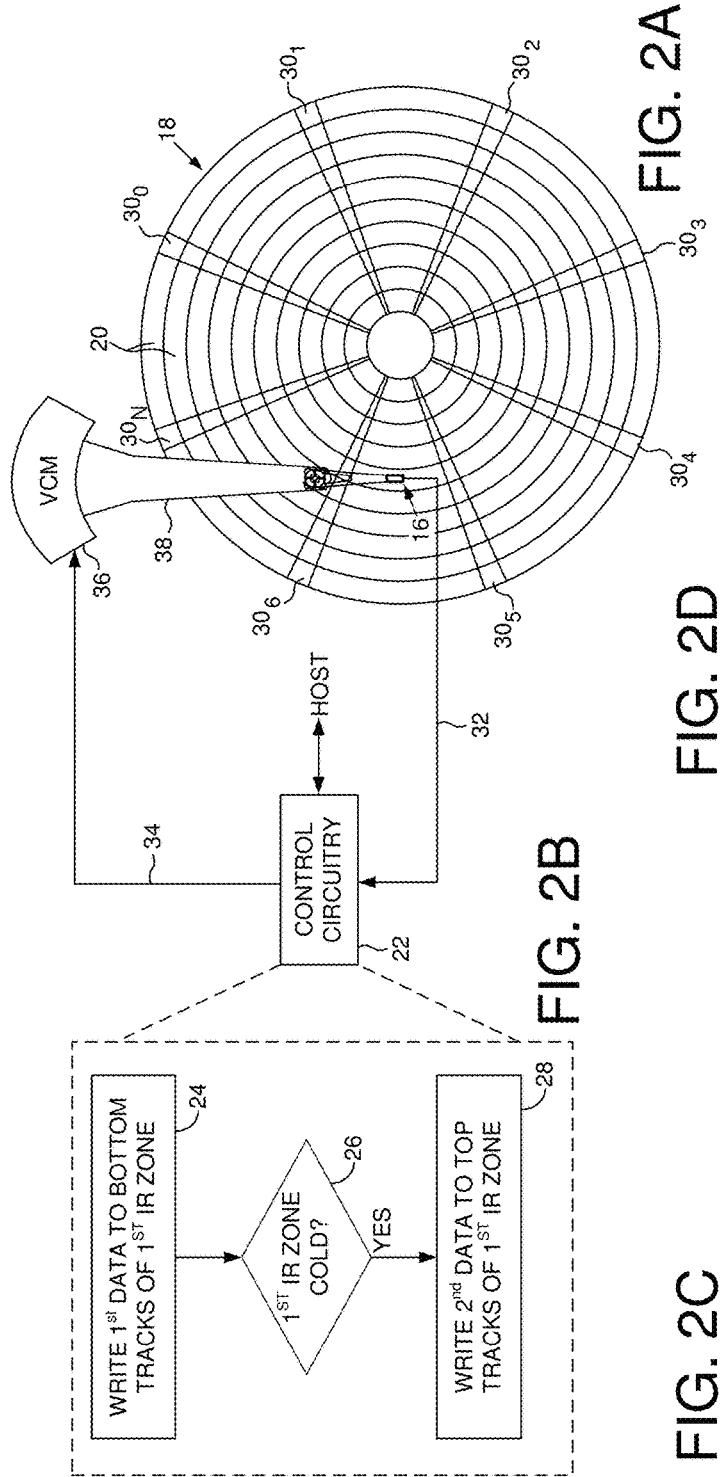
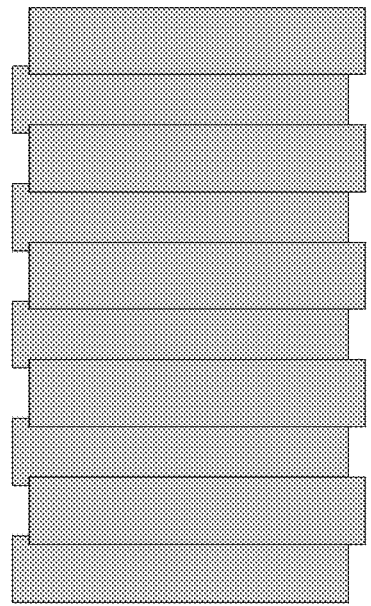
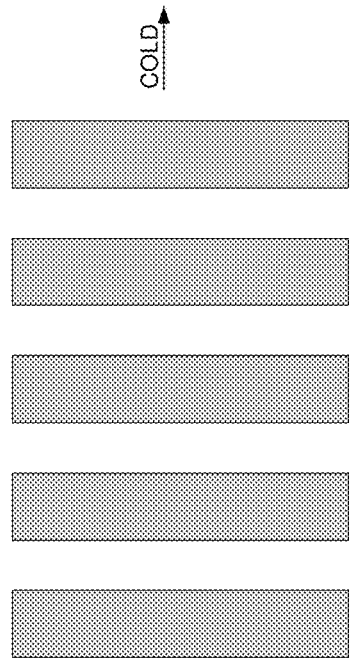
FIG. 2A
FIG. 2B
FIG. 2C
FIG. 2D

DATA STORAGE DEVICE EMPLOYING INTERLACED RECORDING FOR EFFICIENT COLD DATA STORAGE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6i further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk.

FIG. 2B is a flow diagram according to an embodiment wherein the top tracks of an interlaced recording (IR) zone are not written until the IR zone is designated as a cold IR zone.

FIG. 2C shows an embodiment wherein the bottom tracks of an IR zone have been written with cold data.

FIG. 2D shows an embodiment wherein the top tracks of an IR zone are written after the IR zone has been designated a cold IR zone.

DETAILED DESCRIPTION

Figure 1:
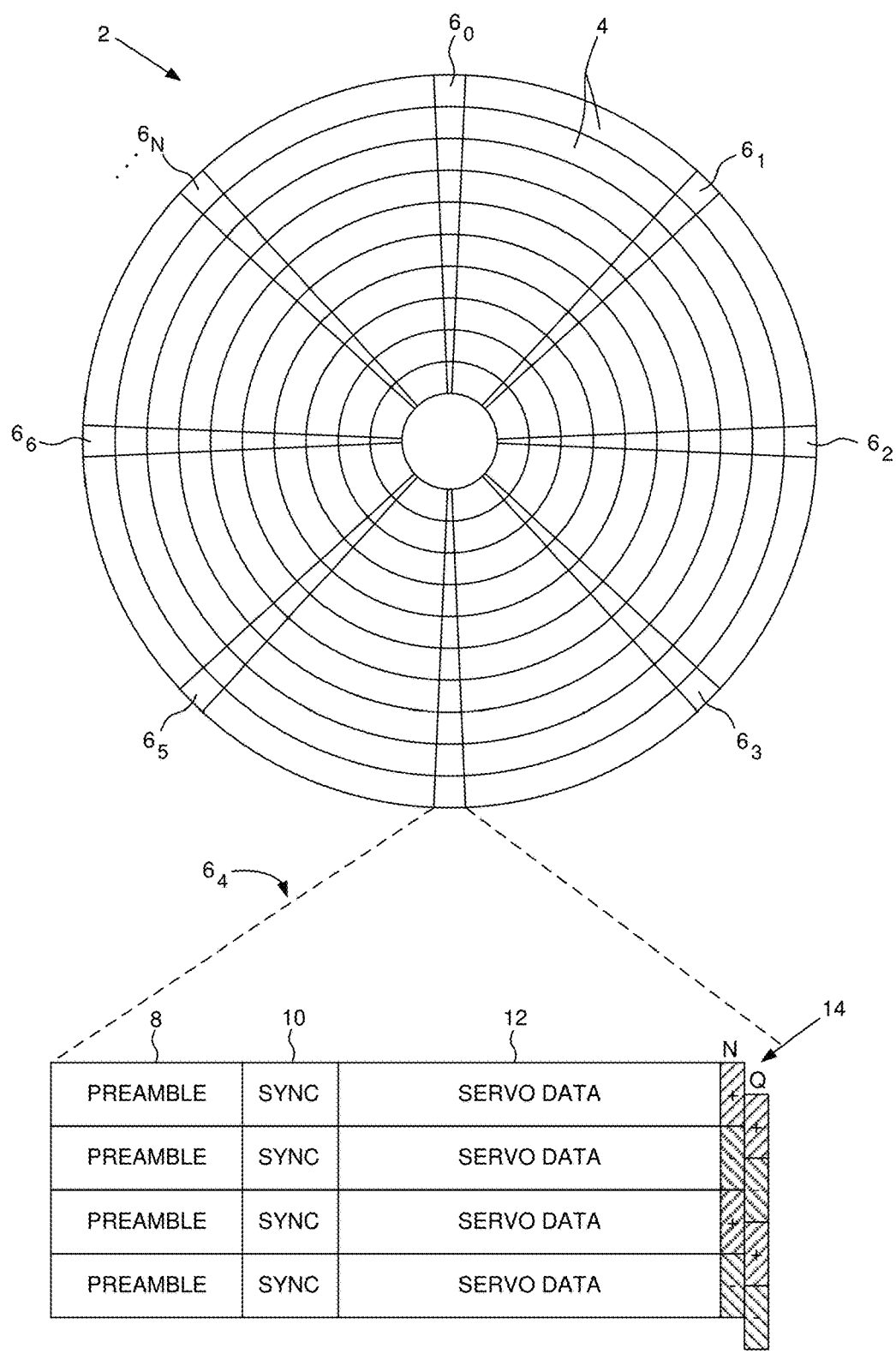
FIG. 1 shows a prior art disk format comprising a plurality of servo tracks defined by servo sectors.

FIG. 2A shows a data storage device in the form of a disk drive according to an embodiment comprising a head 16 actuated over a disk 18 comprising a plurality of tracks 20. The disk drive further comprises control circuitry 22 configured to execute the flow diagram of FIG. 2B, wherein a plurality of interlaced recording (IR) zones are defined on the disk, with each IR zone comprising a plurality of top tracks partially overlapping a plurality of bottom tracks. First data is written to the bottom tracks of a first IR zone (block 24) as illustrated in FIG. 2C, and the first IR zone is identified as a cold IR zone that is storing cold data. In response to identifying the first IR zone as a cold IR zone (block 26), second data is written to the top tracks of the first IR zone (block 28) as illustrated in FIG. 2D.

In the embodiment of FIG. 2A, the disk 18 comprises a plurality of servo sectors 30₀-30N that define a plurality of servo tracks, wherein data tracks are defined relative to the servo tracks at the same or different radial density. The control circuitry 22 processes a read signal 32 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 34 applied to a VCM 36 which rotates an actuator arm 38 about a pivot in order to actuate the head radially over the disk in a direction that reduces the PES. The servo sectors 30₀-30N may comprise any suitable head position information, such as a track address for coarse positioning and servo bursts for fine positioning. The servo bursts may comprise any suitable pattern, such as an amplitude based servo pattern or a phase based servo pattern (FIG. 1).

The data tracks on the disk 18 may be configured into any suitable format, and in one embodiment, the data tracks are grouped into zones where each zone comprises a number of consecutive data tracks. In addition, the data tracks of each zone may be recorded at different radial densities to achieve, for example, different performance versus capacity tradeoffs. In one embodiment, one or more zones may be configured into interleaved recording (IR) zones wherein each IR zone comprises a plurality of top tracks partially overlapping a plurality of bottom tracks as illustrated in FIG. 2D. This configuration increases the capacity of an IR zone but reduces performance due to the read-modify-write operations needed to rewrite the bottom tracks. The performance hit of the IR zones can be avoided by configuring one or more of the zones into conventional recording (CR) zones each comprising a plurality of tracks that do not overlap. However, the CR zones typically have less capacity than the IR zones due to the decrease in radially track density. The prior art has suggested to store cold data (data not frequently rewritten) in the IR zones while storing hot data (data frequently rewritten) in the CR zones. However, it can be difficult to predict whether data received from the host during write operations will ultimately become hot or cold data. New data received from the host may be by default identified as hot data and therefore stored in a CR zone. If the data stored in a CR zone is not rewritten after a predetermined write interval, it may be considered cold data and therefore migrated to an IR zone. However, migrating cold data from a CR zone to an IR zone degrades performance of the disk drive since it requires reading the cold data from the CR zone and then writing the cold data to the IR zone. In the embodiments disclosed, various methods of determining hotness and coldness of data and respective zones are disclosed. These methods are not solely applicable to the embodiments in which they are described and can be used in other embodiments disclosed as well.

Figure 3A:
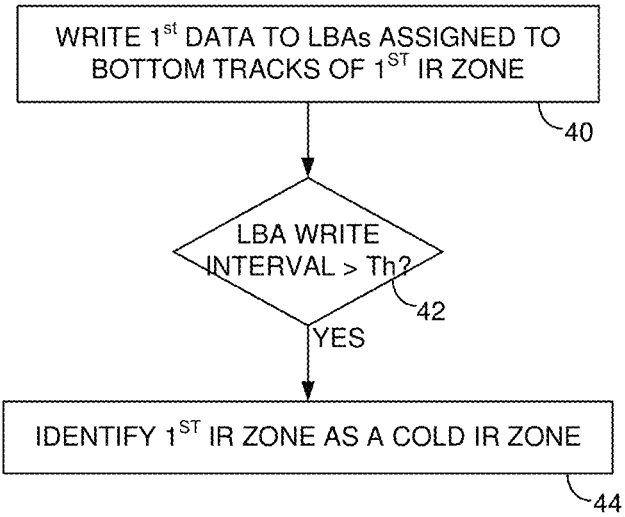
FIG. 3A is a flow diagram wherein after writing data to the bottom tracks of an IR zone, a write interval of the IR zone is evaluated to determine whether the IR zone is storing cold data.
Figure 3B:
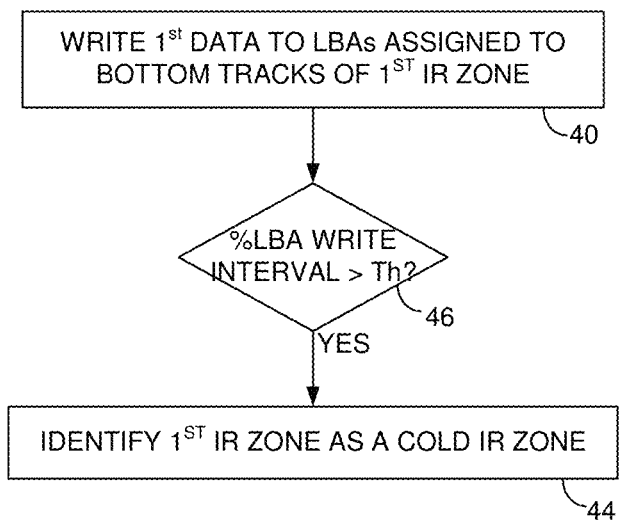
FIG. 3B is a flow diagram wherein an IR zone may be identified as a cold IR zone when the write interval for a predetermined percentage of the stored data exceeds a predetermined threshold.

In one embodiment, the performance degradation of migrating cold data from a CR zone to an IR zone may be avoided by writing new data received from the host to the bottom tracks of an IR zone as shown in FIG. 2C. A write interval is maintained for the data, and when the write interval indicates that at least some of the data stored in the bottom tracks of an IR zone is cold data, the IR zone is identified as a cold IR zone. FIG. 3A is a flow diagram illustrating this embodiment wherein data received from the host may include a logical block addresses (LBAs) assigned to bottom tracks of an IR zone. After the data is written to the bottom track(s) of the IR zone (block 40), a write interval is maintained for the data, and when the write interval exceeds a threshold (block 42), the data is considered cold data and therefore the IR zone is identified as a cold IR zone (block 44). New data received from the host may then be written to the top tracks of the IR zone as illustrated in FIG. 2D. In an embodiment illustrated in FIG. 3B, an IR zone may be identified as a cold IR zone when the write interval for a predetermined percentage of the stored data exceeds a predetermined threshold (block 46). For example, an IR zone may be identified as cold when at least 70% of the bottom tracks store cold data.

Before an IR zone is identified as a cold IR zone, the bottom tracks may be rewritten any number of times since the top tracks for the IR zone have not yet been written. That is, an IR zone that has not been identified as a cold IR zone may function similar to a CR zone having a low radial density due to the spacing between the bottom tracks. In one embodiment, a number of the IR zones may be designated as hot IR zones for storing hot data as identified by the write frequency for the data. In this embodiment, there may be neutral IR zones for storing new data received from the host. The write frequency for the corresponding LBAs may be monitored, and if the write frequency exceeds a threshold, the LBA may be designated as a hot LBA. During the next rewrite operation of a hot LBA, the LBA may be reassigned to a bottom track of a hot IR zone. Alternatively, when it is determined that a substantial part of a neutral IR zone is storing hot data, the entire neutral IR zone may be re-designated as a hot IR zone instead of reassigning the LBAs to a different hot IR zone.

Figure 3C:
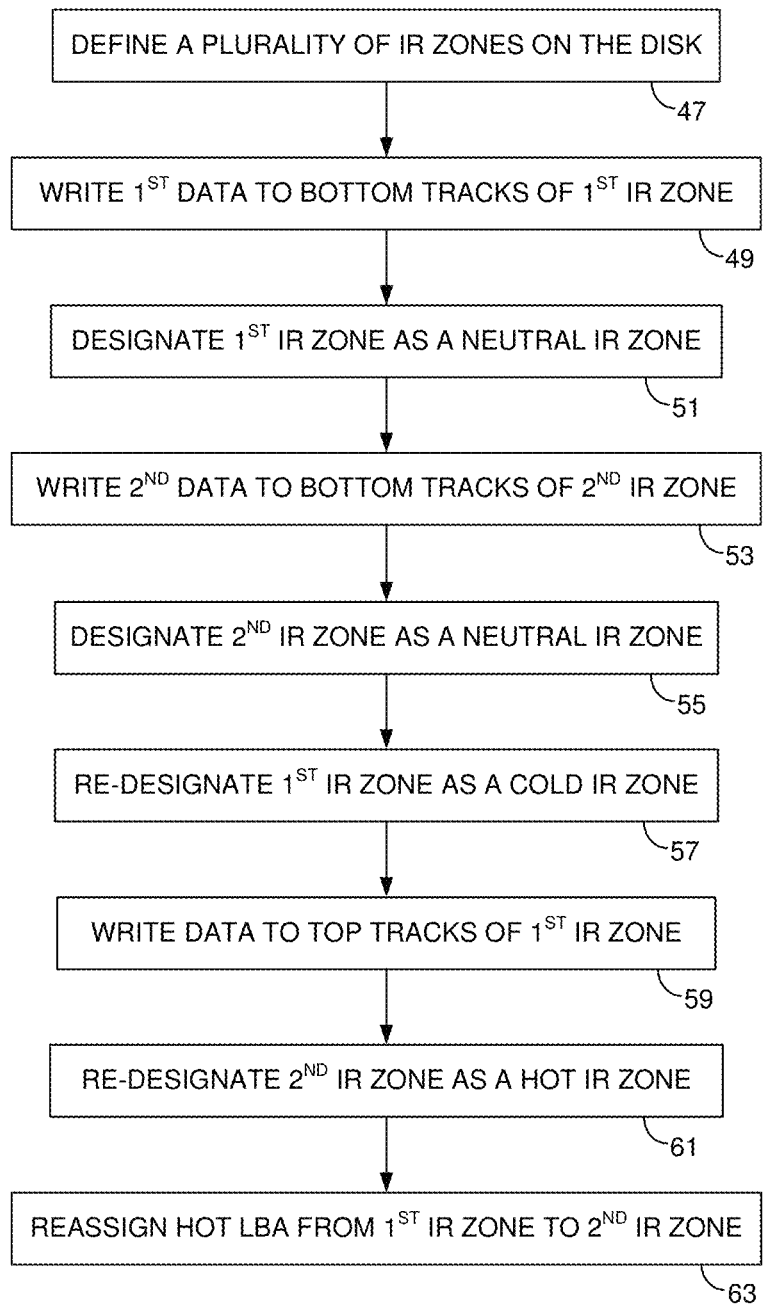
FIG. 3C is a flow diagram according to an embodiment wherein a plurality of neutral IR zones are defined on the disk, and over time one or more of the neutral IR zones may be re-designated as a hot IR zone storing hot data or a cold IR zone storing cold data.

FIG. 3C is a flow diagram illustrating an example of this embodiment wherein a plurality of IR zones are defined on a disk, wherein each IR zone comprises a plurality of top tracks partially overlapping a plurality of bottom tracks (block 47). First data is written to the bottom tracks of a first IR zone (block 49), and the first IR zone is designated as a neutral IR zone (block 51). Second data is written to the bottom tracks of a second IR zone (block 53), and the second IR zone is designated as a neutral IR zone (block 55). The first IR zone is re-designated from a neutral IR zone to a cold IR zone that is storing cold data (block 57). In response to re-designating the first IR zone as a cold IR zone, data is written to the top tracks of the first IR zone (block 59). The second IR zone is re-designated from a neutral IR zone to a hot IR zone (block 61). In response to re-designating the second IR zone as a hot IR zone, a logical block address (LBA) assigned to the first IR zone and storing hot data is reassigned to a bottom track of the second IR zone (block 63).

Over time, a hot IR zone may be identified as storing cold data, and therefore the hot IR zone may be re-designated as a cold IR zone so that the top tracks of the IR zone may be written. During a garbage collection operation described in greater detail below, in one embodiment a newly recovered IR zone (empty IR zone) may be designated as either a neutral or hot IR zone depending on the current inventory and need for each type of zone. That is, in one embodiment an IR zone may be initially designated as a neutral IR zone that is later re-designated as a hot IR zone, or the IR zone may be initially designated as a hot IR zone for storing hot data (e.g., hot data reassigned to the hot IR zone during the garbage collection operation).

Figure 4A:
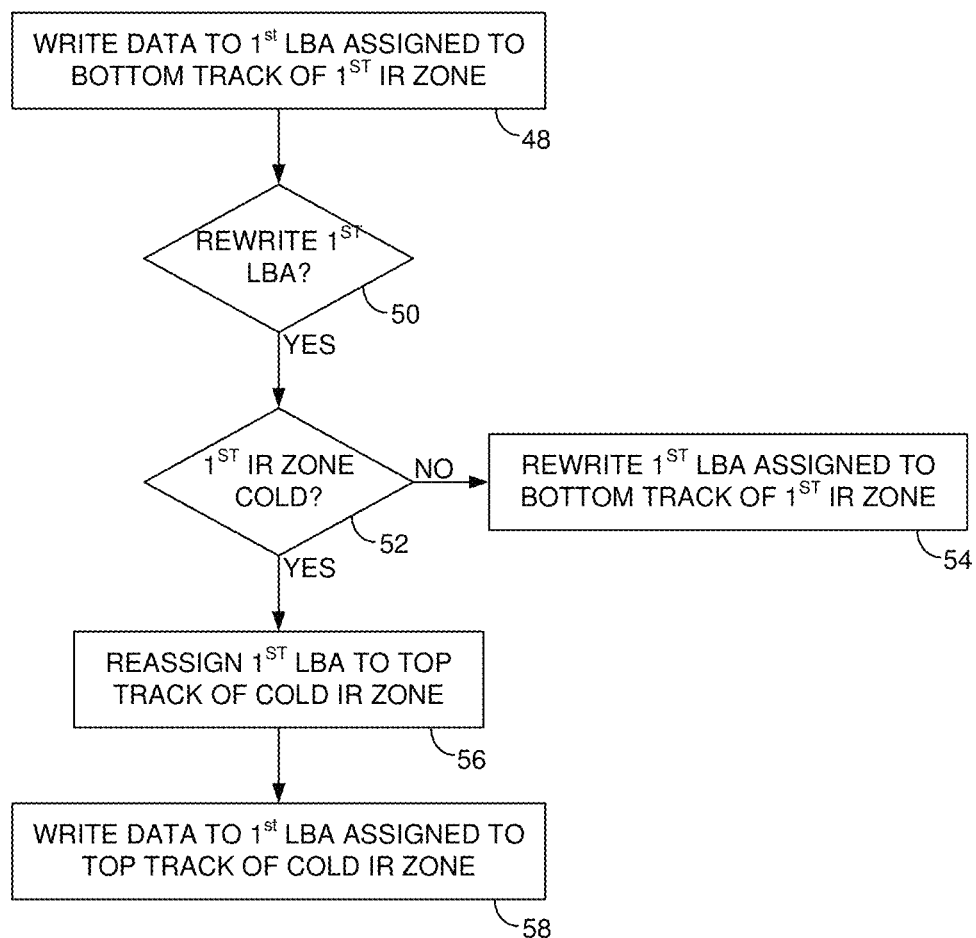
FIG. 4A is a flow diagram according to an embodiment wherein when the LBA assigned to a bottom track of an IR zone is rewritten, if the IR zone is a cold IR zone the LBA is reassigned to a different IR zone.

In one embodiment, when a write operation is received for an LBA assigned to a bottom track of a cold IR zone, the LBA may be reassigned to a different zone so as to avoid the read-modify-write operations that would otherwise be required to rewrite the top and bottom tracks. FIG. 4A shows an example of this embodiment wherein a write command received from the host may include new data and a new LBA that is assigned to the bottom track of a neutral IR zone (block 48). Sometime later, a subsequent write command may be received from the host in order to rewrite the LBA with new data (block 50). If the IR zone has not yet been designated a cold IR zone (block 52) which means the top tracks have not been written, the LBA assigned to the bottom track may be rewritten (block 54) similar to rewriting a track of a CR zone. However, when the IR zone has been identified as a cold IR zone (block 52) and the top tracks have been written, the LBA is reassigned to a different IR zone. For example, the LBA may be reassigned to the bottom track of a neutral IR zone, or as in the embodiment of FIG. 4A, the LBA may be reassigned to a top track of a cold IR zone (block 56) before writing the data to the reassigned LBA (block 58). In one embodiment, when rewriting a cold LBA the LBA may be relabeled as a warm LBA meaning that it is assumed the LBA will be rewritten with a moderate degree of frequency. Accordingly, the warm LBA may be reassigned to the top tracks of a cold IR zone since the top tracks may be rewritten a moderate number of times before the cold IR zone needs refreshing (due to the intertrack interference of the top tracks affecting the bottom tracks).

Figure 4B:
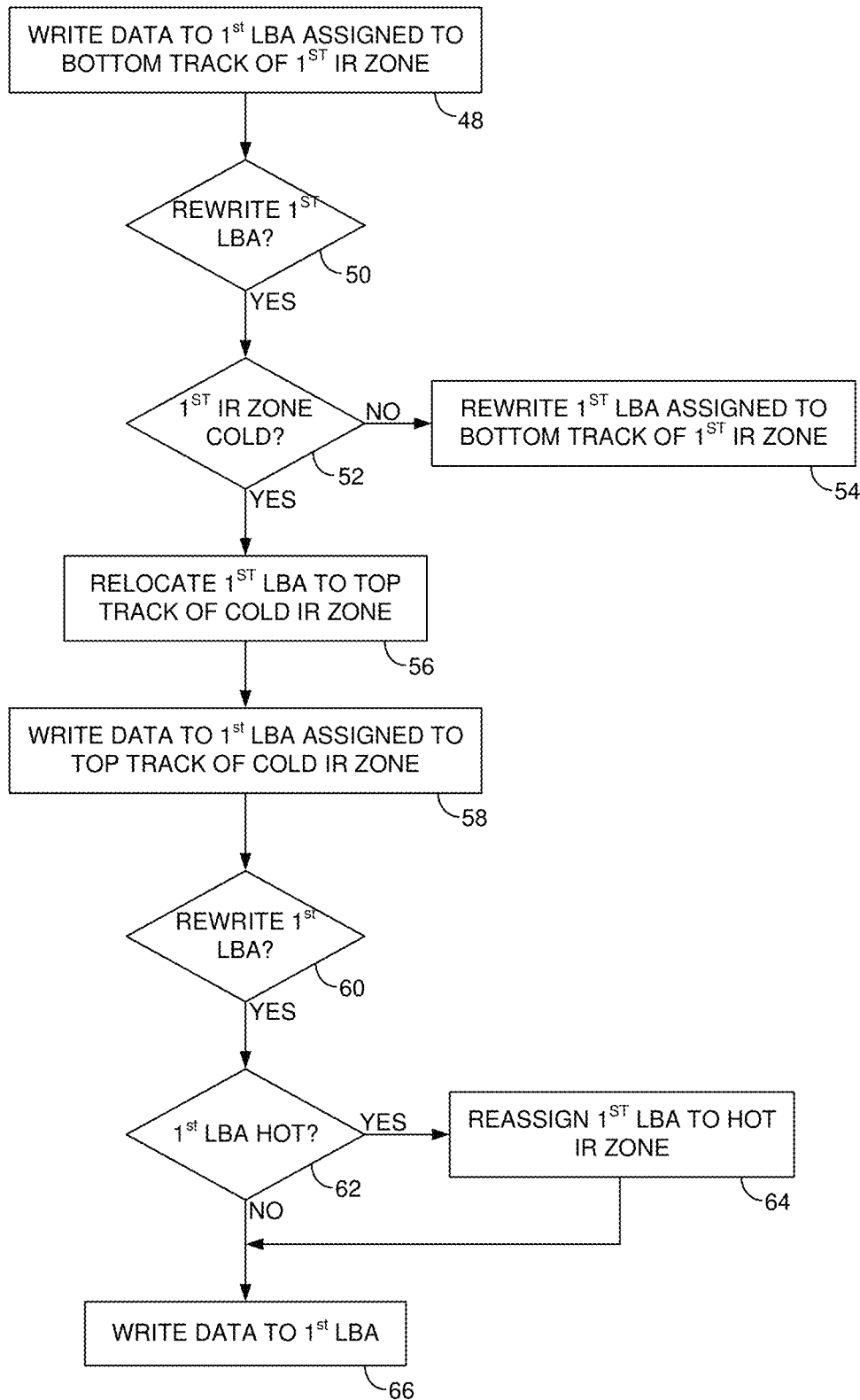
FIG. 4B is a flow diagram according to an embodiment wherein when an LBA assigned to a top track of a cold IR zone is considered a hot LBA due to being written frequently, the LBA is reassigned to a hot IR zone during a write operation of the LBA.

FIG. 4B is a flow diagram according to an embodiment which extends on the flow diagram of FIG. 4A, wherein when an LBA assigned to a top track of a cold IR zone is rewritten (block 60), the write intervals of the LBA are evaluated to determine whether the LBA is being rewritten frequently and therefore considered a hot LBA (block 62). When the LBA is detected as being hot, the hot LBA is reassigned to the bottom track of a hot IR zone (block 64) before writing the data to the LBA (block 66). In this manner, the intertrack interface that may corrupt the bottom tracks of a cold IR zone due to writing the top tracks is reduced by relocating the hot LBAs assigned to the top tracks to the bottom tracks of a hot IR zone.

Figure 5A:
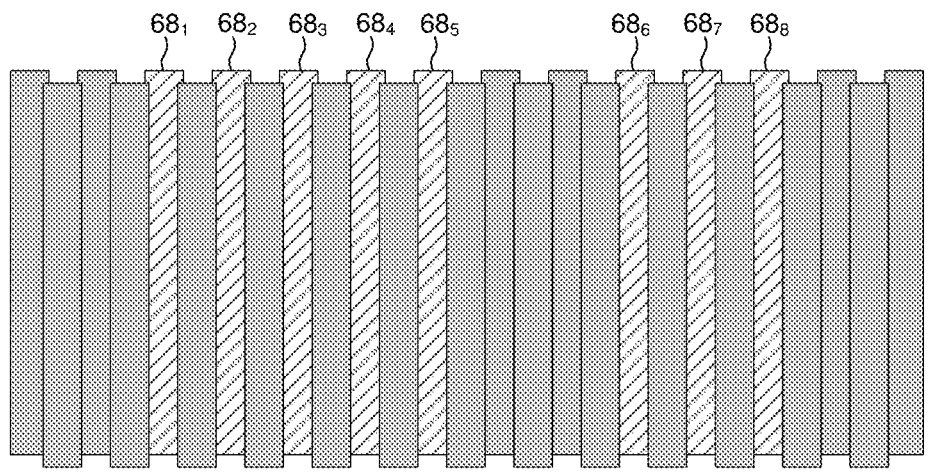
FIG. 5A shows an embodiment wherein a cold IR zone may be garbage collected when an amount of invalid data within the IR zone exceeds a threshold.

FIG. 5A shows an embodiment wherein when one or more LBAs assigned to a bottom track of a cold IR zone are rewritten, the LBAs may first be reassigned to a different IR zone (e.g., the bottom or top track of an IR zone). This dynamic relocation of the LBAs during a write operation leaves invalid data stored in the bottom tracks of the cold IR zone. In one embodiment when the number of invalid LBAs or number of bottom tracks storing one or more invalid LBAs exceeds a threshold, a garbage collection operation is executed on at least part of the cold IR zone in order to recover the unused area of the disk. The garbage collection operation involves reading the data stored in the valid LBAs, reassigning the LBAs to different IR zones, and rewriting the data to the reassigned LBAs. In one embodiment, the garbage collection operation is performed on the entire cold IR zone by relocating all of the valid data (stored in the bottom and top tracks) to one or more different IR zones. The resulting empty IR zone may then be configured into any suitable state, such as by designating the empty IR zone as either a neutral IR zone or a hot IR zone. The example of FIG. 5A shows eight invalid bottom tracks (68₁-68₈) which may trigger a garbage collection of the cold IR zone; however, the garbage collection operation may be triggered based on any suitable threshold. In addition, the garbage collection threshold may be dynamically adjusted based on any suitable factors, such as the amount of free space available and/or the workload of the disk drive.

Figure 5B:
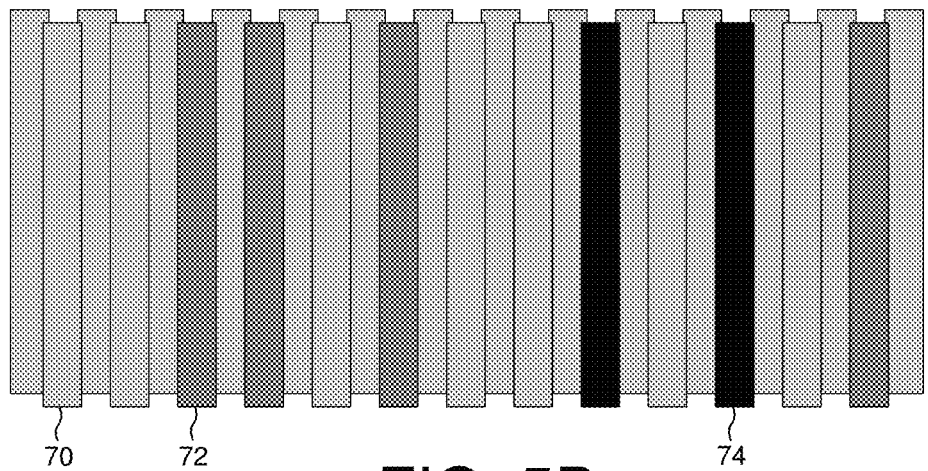
FIG. 5B is a flow diagram according to an embodiment wherein a garbage collection or refresh operation may be executed on at least part of a cold IR zone when a number of write operations to the top tracks exceeds a threshold.

FIG. 5B shows an embodiment wherein a garbage collection or refresh operation may be executed on at least part of a cold IR zone when the write operations to the top tracks of the cold IR zone degrades the integrity of the data stored in one or more of the bottom tracks due to intertrack interference. In this embodiment, the top tracks of a cold IR zone may be rewritten a number of times, but each write to a top track degrades the integrity of the adjacent bottom tracks. Accordingly, in this embodiment, the bottom tracks may degrade to a level where they should either be garbage collected or refreshed before the degradation renders the data stored in the bottom tracks unrecoverable. Refreshing a bottom track involves reading the data from the bottom and top tracks and then rewriting the data to the bottom and top tracks. In one embodiment, a write counter may be assigned to the top tracks of a cold IR zone wherein the cold IR zone may be garbage collected or refreshed when the write counter exceeds a threshold. In another embodiment, a write counter may be assigned to each top and/or bottom track within a cold IR zone and the cold IR zone garbage collected or refreshed based on the individual and/or accumulated effect of the write operations across the cold IR zone. For example, individual write counters may trigger the refresh of a corresponding bottom track, or the accumulated effect of the write operations as detected from the write counters may trigger a garbage collection or refresh operation of the entire cold IR zone.

In one embodiment, when garbage collecting or refreshing all or part of a cold IR zone, the LBAs assigned to the top tracks may be reassigned to different IR zones based on their corresponding write intervals (i.e., write frequency). An LBA may be designated as "cold" meaning the LBA has been written once, "warm" meaning the LBA is being rewritten at a low frequency, or "hot" meaning the LBA is being rewritten at a high frequency. FIG. 5B illustrates an example cold IR zone having top tracks rewritten at a varying frequency as represented by a varying shade of grey. That is, a light shade represents a cold track (e.g., track 70), a medium shade represents a warm track (e.g., track 72), and a dark shade representing a hot track (e.g., track 74). In one embodiment during a garbage collection or refresh operation, the cold LBAs assigned to the top tracks shown in FIG. 5B may be reassigned to the bottom tracks of a neutral IR zone, the warm LBAs assigned to the top tracks may be rewritten to the top tracks of the same cold IR zone or reassigned to the top tracks of a different cold IR zone, and the hot LBAs assigned to the top tracks may be reassigned to the bottom tracks of a hot IR zone. In this manner, the hot LBAs may be rewritten any number of times within the hot IR zone without data degradation occurring from intertrack interference.

In the embodiments described above, the disk may be formatted to comprise any suitable number of IR zones, wherein each IR zone may comprise any suitable number of tracks. In one embodiment, the disk may be formatted to comprise a number of IR zones as well as other types of zones, such as a number of CR zones and/or a number of shingled recording zones. In addition, different IR zones such as the neutral and hot IR zones described above may be defined at any suitable radial location across the disk. For example, in one embodiment a number of neutral IR zones may be defined toward the inner diameter of the disk whereas a number of hot IR zones may be defined toward the outer diameter of the disk which typically has a higher throughput. In one embodiment when garbage collecting a cold IR zone as described above, the empty IR zone may be converted into a neutral IR zone or a hot IR zone based on the radial location of the IR zone.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

In the embodiment of FIG. 2B, the control circuitry 22 configured to execute the flow diagram of FIG. 2B may be implemented within the data storage device, for example, with other control circuitry that is configured to interface with the host. In another embodiment, one or more of the blocks in the flow diagram shown in FIG. 2B may be executed by control circuitry within the host.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A device comprising control circuitry configured to:
   define a plurality of interlaced recording (IR) zones on a disk comprising a plurality of tracks, wherein each IR zone comprises a plurality of top tracks partially overlapping a plurality of bottom tracks;
   cause first data to be written to the bottom tracks of a first IR zone;
   identify the first IR zone as a cold IR zone that is storing cold data; and
   in response to identifying the first IR zone as a cold IR zone, cause second data to be written to the top tracks of the first IR zone.

2. The device as recited in claim 1, wherein the control circuitry is further configured to identify the first IR zone as storing cold data based on a write interval of logical block addresses (LBAs) assigned to the first IR zone.

3. The device as recited in claim 2, wherein the control circuitry is further configured to identify the first IR zone as storing cold data when the write interval of a predetermined number the LBAs exceeds a threshold.

4. The device as recited in claim 1, wherein the control circuitry is further configured to:
   cause data to be written to a first logical block address (LBA) assigned to a bottom track of the first IR zone; and
   when processing a first command to rewrite the first LBA:
      when the first IR zone is not a cold IR zone, cause data to be written to the LBA assigned to the bottom track of the first IR zone; and
      when the first IR zone is a cold IR zone:
         reassign the first LBA to a track of a second IR zone; and
         cause data to be written to the reassigned LBA.

5. The device as recited in claim 4, wherein the second IR zone is a cold IR zone.

6. The device as recited in claim 5, wherein the track of the second IR zone is a top track of the second IR zone.

7. The device as recited in claim 6, wherein when processing a second command to rewrite the first LBA assigned to the second IR zone, the control circuitry is further configured to:
   identify the first LBA as a hot LBA storing hot data based on a write frequency of the first LBA; and
   in response to identifying the first LBA as a hot LBA, reassigning the first LBA to a bottom track of a hot (IR) zone configured to store hot data.

8. The device as recited in claim 1, wherein the control circuitry is further configured to cause the first IR zone to be garbage collected by causing reading/rewriting of valid data stored in the first IR zone.

9. The device as recited in claim 8, wherein the control circuitry is further configured to cause the first IR zone to be garbage collected based on an amount of invalid data stored in the first IR zone.

10. The device as recited in claim 8, wherein the control circuitry is further configured to cause the first IR zone to be garbage collected based on a number of writes to the top tracks of the first IR zone.

11. The device as recited in claim 8, wherein the control circuitry is further configured to cause the first IR zone to be garbage collected by:
    causing writing of cold valid data stored in the top tracks of the first IR zone to the bottom tracks of a second IR zone; and
    causing writing of warm valid data stored in the top tracks of the first IR zone to the top tracks of a third IR zone.

12. The device as recited in claim 11, wherein the control circuitry is further configured to cause the first IR zone to be garbage collected by causing writing of hot valid data stored in the top tracks of the first IR zone to the bottom tracks of a hot IR zone configured to store hot data.

13. A method of operating a data storage device, the method comprising:
    defining a plurality of interlaced recording (IR) zones on a disk, wherein each IR zone comprises a plurality of top tracks partially overlapping a plurality of bottom tracks;
    writing first data to the bottom tracks of a first IR zone;
    designating the first IR zone as a neutral IR zone;
    writing second data to the bottom tracks of a second IR zone;
    designating the second IR zone as a neutral IR zone;
    re-designating the first IR zone from a neutral IR zone to a cold IR zone that is storing cold data;

in response to re-designating the first IR zone as a cold IR zone, writing data to the top tracks of the first IR zone;
re-designating the second IR zone from a neutral IR zone to a hot IR zone; and
in response to re-designating the second IR zone as a hot IR zone, reassign to a bottom track of the second IR zone a logical block address (LBA) assigned to the first IR zone and storing hot data.

14. The method as recited in claim 13, further comprising re-designating the first IR zone as a cold IR zone based on a write interval of logical block addresses (LBAs) assigned to the first IR zone.

15. The method as recited in claim 14, further comprising re-designating the first IR zone as a cold IR zone when the write interval of a predetermined number the LBAs exceeds a threshold.

16. The method as recited in claim 13, further comprising identifying the LBA storing hot data based on a write frequency of the LBA.

17. The method as recited in claim 13, further comprising garbage collecting the first IR zone by reading/rewriting valid data stored in the first IR zone.

18. The method as recited in claim 17, further comprising garbage collecting the first IR zone based on an amount of invalid data stored in the first IR zone.

19. The method as recited in claim 18, further comprising garbage collecting the first IR zone based on a number of writes to the top tracks of the first IR zone.

20. The method device as recited in claim 18, further comprising garbage collecting the first IR zone by:
writing cold valid data stored in the top tracks of the first IR zone to the bottom tracks of a third IR zone; and
writing warm valid data stored in the top tracks of the first IR zone to the top tracks of a fourth IR zone.

\* \* \* \* \*